July 18, 1950 M. H. KALINA 2,515,231
VALVE ARRANGEMENT
Filed June 12, 1944 6 Sheets-Sheet 2
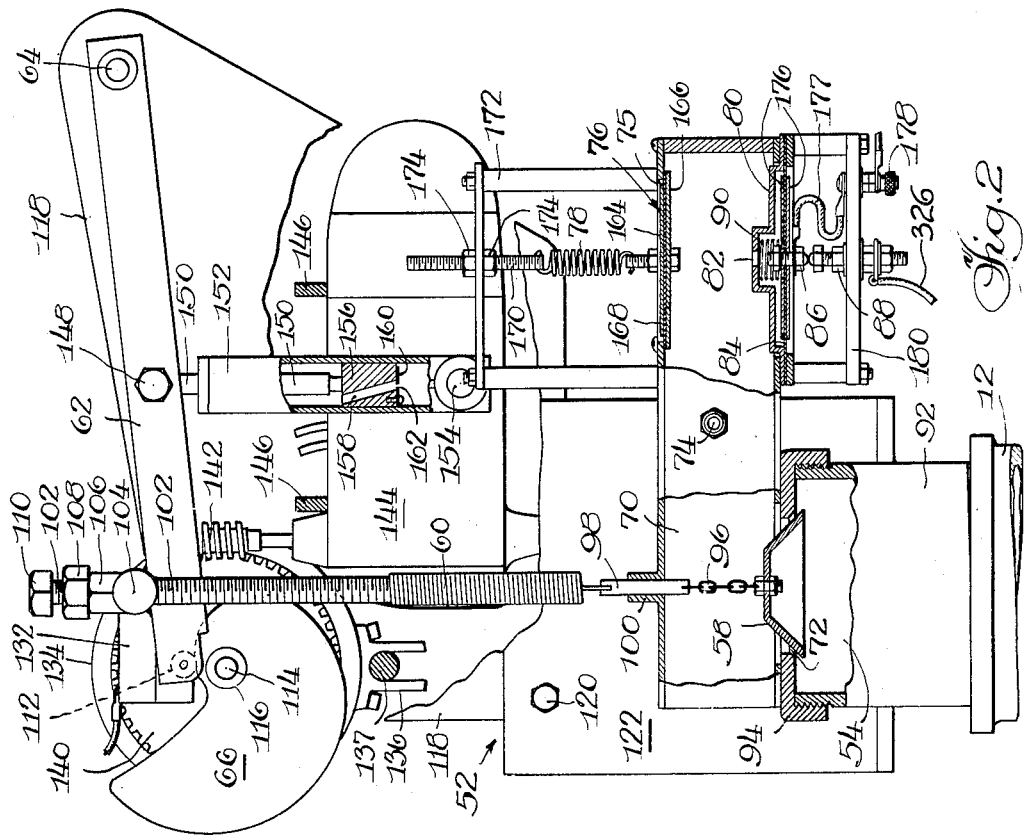
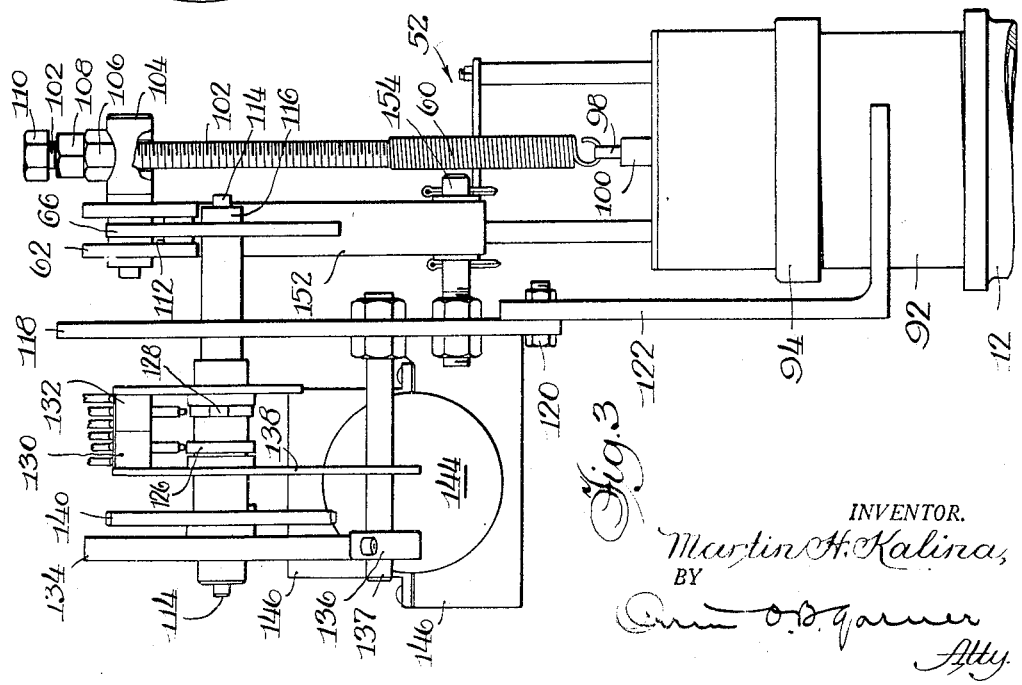
INVENTOR.
Martin H. Kalina,
BY
Atty.

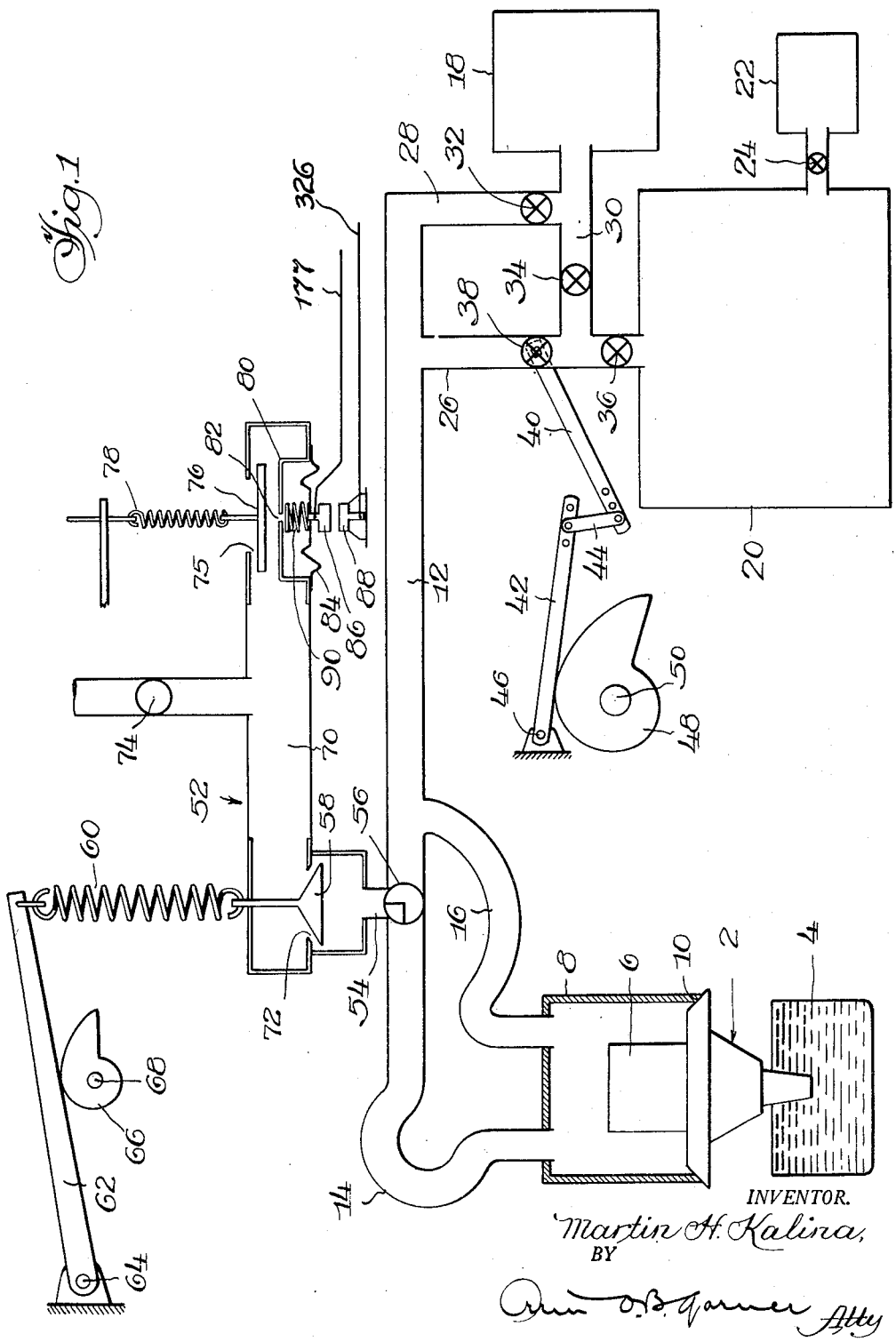

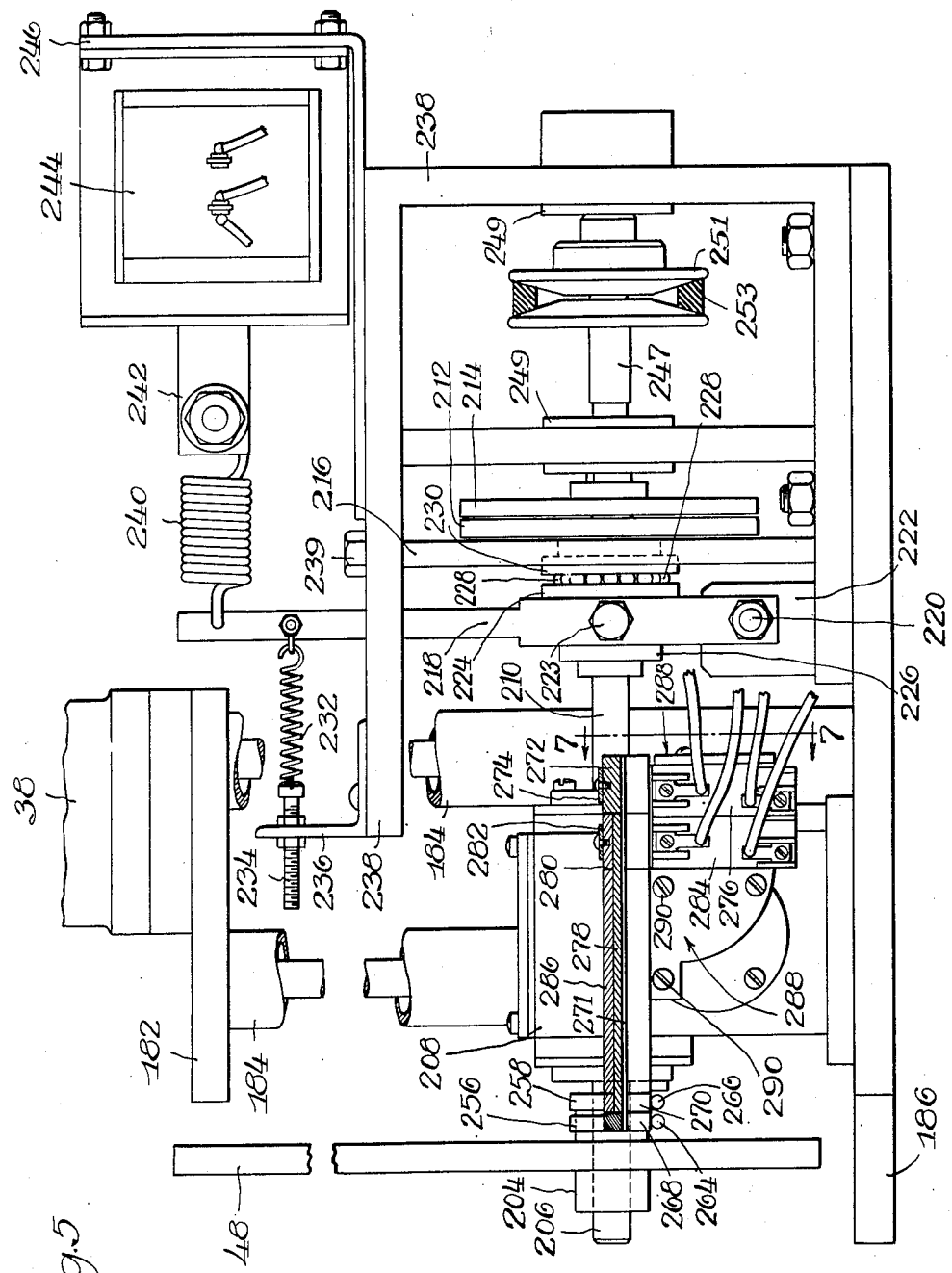

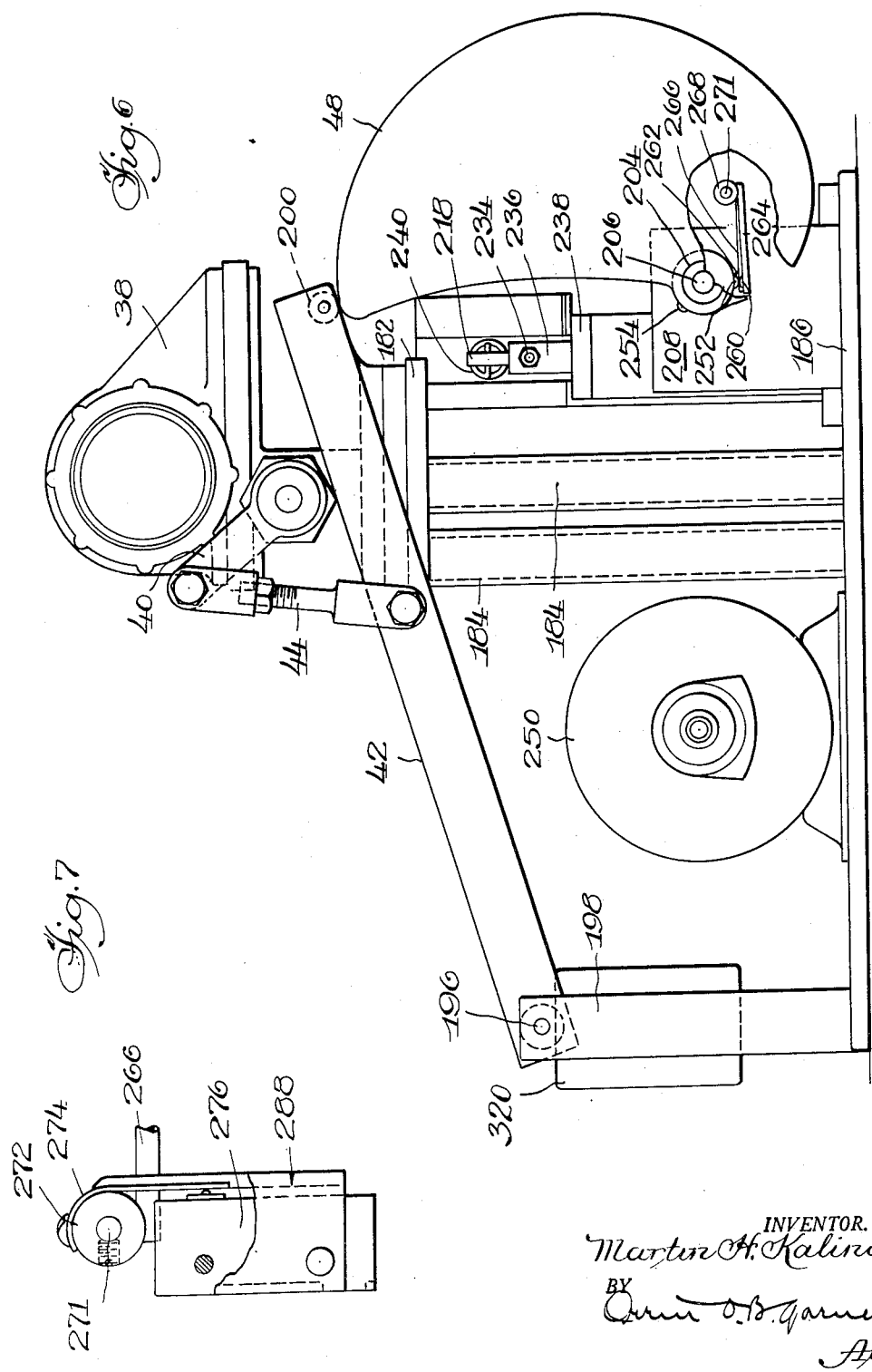

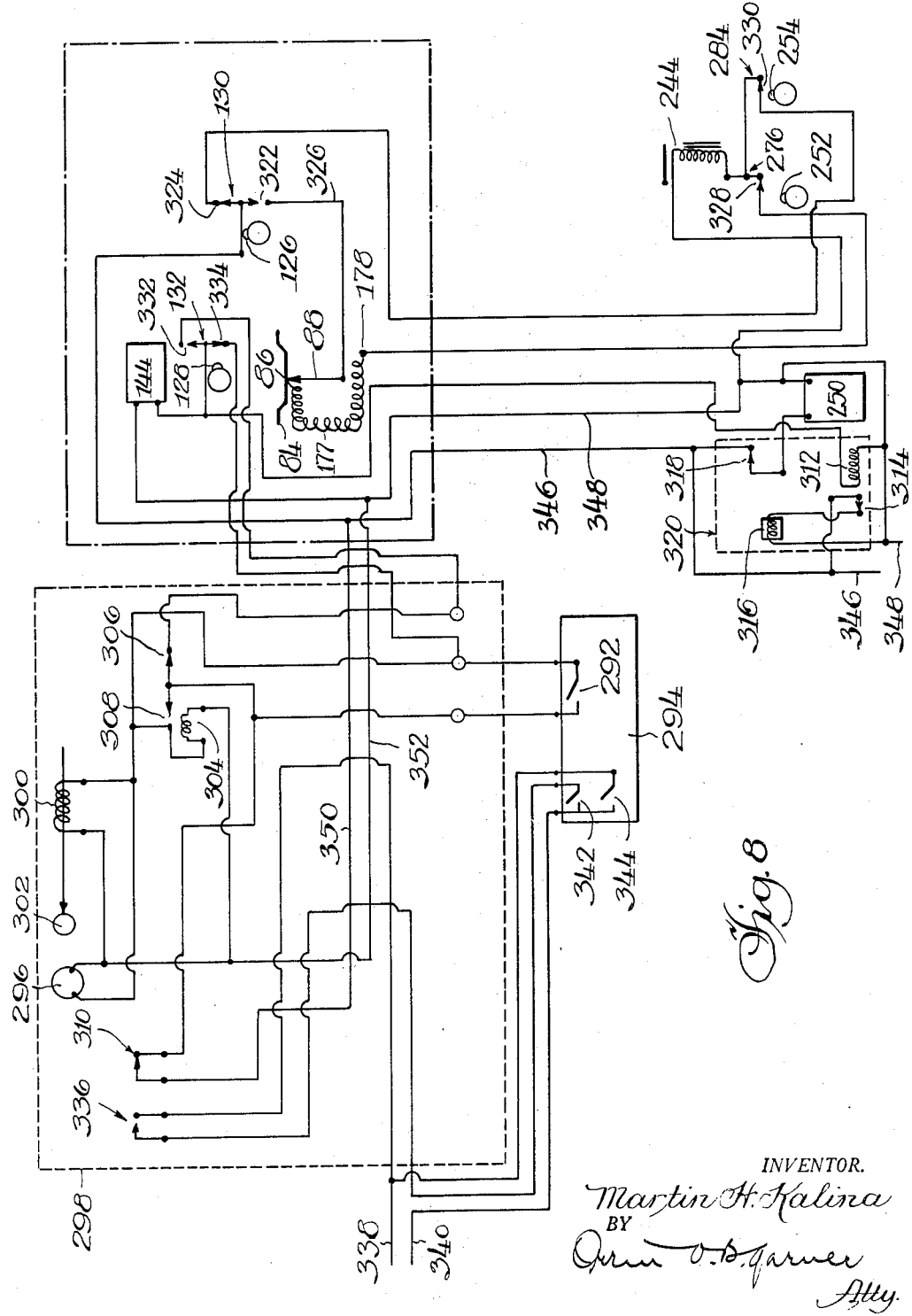

Patented July 18, 1950

2,515,231

UNITED STATES PATENT OFFICE 2,515,231

VALVE ARRANGEMENT

Martin H. Kalina, Chicago, Ill., assignor, by mesne assignments, to Wetherill Engineering Company, a corporation of Delaware Application June 12, 1944, Serial No. 539,868

12 Claims. (Cl. 22—73)

My invention relates in general to automatic vacuum control means and more particularly to a novel apparatus for the control of vacuum in a system utilized in the countergravity casting of metal, as shown and described in the Thomas C. Poulter Patent No. 2,379,401, issued June 26, 1945, and entitled "Method and Apparatus for Casting Metal."

The general object of my invention is to devise automatic means for controlling the pressure in a vacuum system in accordance with any desired predetermined time-pressure curve or pattern within a wide range of such curves. A similar apparatus, which controls the pressure in a vacuum system in accordance with a single predetermined time-pressure curve or pattern, is shown and described in the patent to Thomas C. Poulter and Charles F. Strom, Patent No. 2,402,913, dated June 25, 1946, for "Vacuum Control Means and Method."

The primary object of my invention is to provide control means whereby the rate of evacuation, the duration of evacuation, the minimum and maximum vacuum values, and the duration of the maximum vacuum are all readily adjustable and may be set to any predetermined value within the limits of the apparatus in not more than a few minutes.

Another object of my invention is to devise automatic means for controlling the vacuum in a closed chamber within any desired fixed maximum limit.

Still another object of my invention is to provide such automatic control means as will enable the rate at which the vacuum is developed to be accurately controlled, thus making it possible to increase the vacuum at a predetermined fast or slow rate as may be desired. Such control is essential in order to duplicate results obtained from time to time as the equipment may be utilized under varying conditions.

A further object of my invention is to provide such automatic control means as that above referred to wherein automatic compensating means will be afforded for any minor leaks which may occur in the system.

My invention also comprehends such an arrangement as will afford the free and unrestricted passage of any sudden surges of gas as may occur in the casting equipment due to the evolution of core gases, and provides for the immediate dissipation of any such surge of gases developed within the system.

Another object of my invention is to provide means for automatically increasing the capacity of the exhaust or pumping means or, in other words, increasing the rate at which gases are exhausted from the system whenever said rate is insufficient to accommodate the predetermined rate of increase.

In my novel system, valve means is provided for by-passing atmospheric pressure into the system against resilient resistance which is gradually increased according to a predetermined rate as in said Patent No. 2,402,913. However, in the event that the exhaust means for the system fails to evacuate gases therefrom at a sufficient rate to maintain the by-pass valve means in its open position against said gradually increasing resistance, I have provided means for automatically increasing the capacity of said exhaust means until said by-pass valve means is again opened to the admission of atmospheric pressure.

My invention also comprehends such an arrangement as that above described wherein the vacuum which is developed within the system may be automatically released after a predetermined period, and in which the entire cycle of operations is automatically controlled.

It will be understood that in casting ferrous metal, such as steel, by a countergravity method such as that above described and particularly disclosed in said Patent No. 2,379,401, the mold for the article to be cast is mounted within a vacuum chamber and it is necessary that the metal be drawn into the mold at a uniform rate which may be controlled in spite of leaks which may occur in the system. It is also necessary to be able to repeat the process time after time with no significant variation of the vacuum control if successive, substantially identical castings are to be produced.

A different object of my invention is to provide a novel apparatus such as above described, wherein the atmospheric pressure is by-passed into the system through the bell or vacuum housing in which the mold is mounted over a gate assembly communicating with a supply of molten metal. This arrangement has proved to be extremely useful, under certain conditions, in carrying away explosive core gases liberated from the mold, thus minimizing the danger of an explosion within the bell.

In the drawings,

Figure 1 is a schematic diagram of my novel vacuum system.

Figures 2 and 3 illustrate in detail my novel by-pass valve mechanism, Figure 2 being a side elevation thereof with portions of the structure broken away to clarify the illustration, and Figure 3 being an end view taken from the left as seen in Figure 2.

Figure 4:
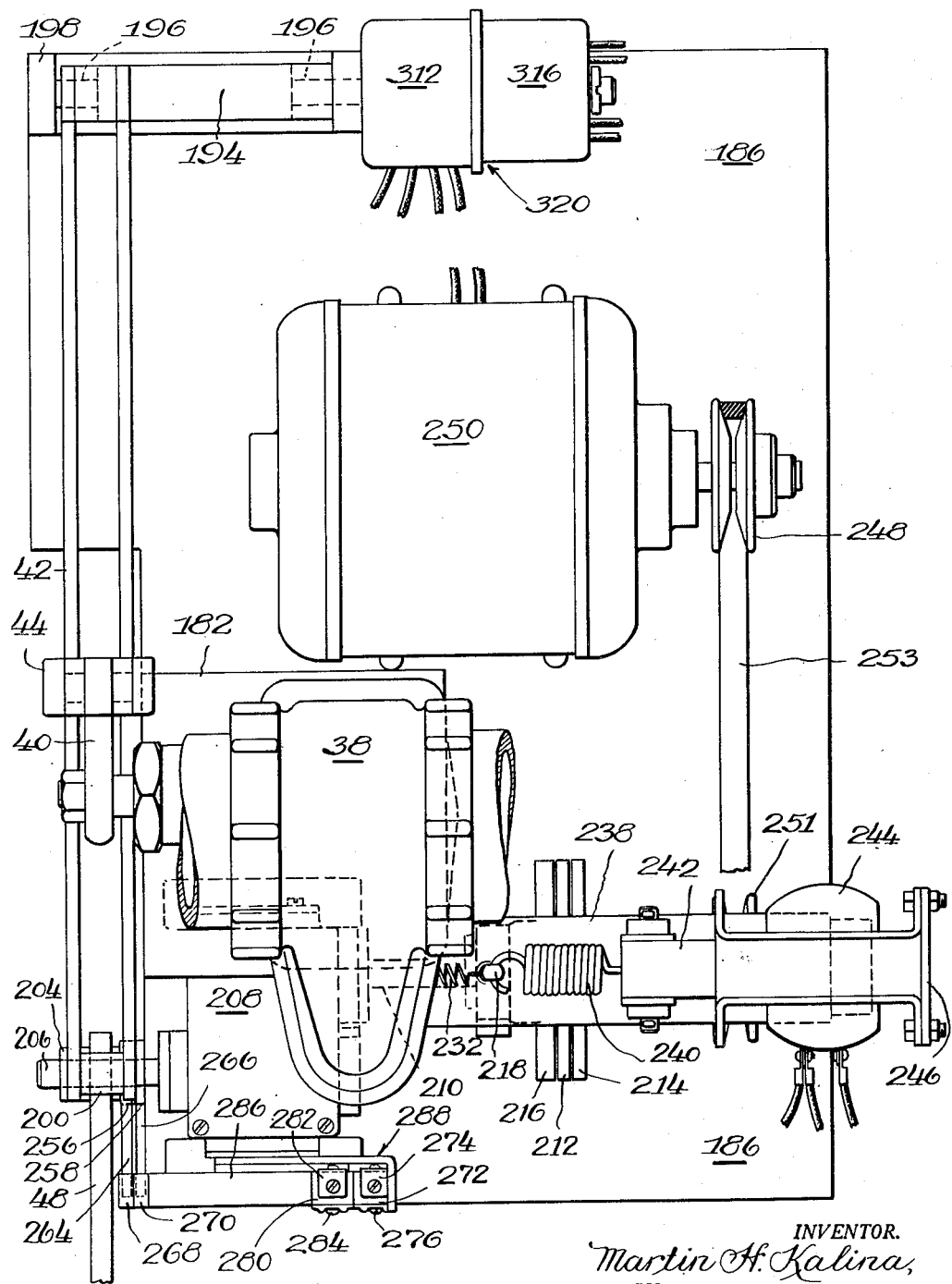

Figures 4 to 7 inclusive illustrate in detail the gate valve and novel actuating mechanism therefor, Figure 4 being a top plan view, Figure 5 being an end elevation taken from the bottom as seen in Figure 4, Figure 6 being a side elevation taken from the left as seen in Figure 4, and Figure 7 being a fragmentary elevational view taken from the point indicated by the line 7—7 of Figure 5. In each of said views, portions of the structure are broken away where convenient for the purpose of clarifying the illustration.

Figure 8 is a schematic diagram illustrating the electrical connections utilized in my novel control apparatus.

Describing my invention in detail and referring first to Figure 1, my novel casting apparatus comprises a gate assembly generally designated 2 and preferably of the design shown and described in said Patent No. 2,379,401. The gate assembly 2 communicates with a container of molten metal designated 4, and is supported by an associated platform (not shown). Mounted on the gate assembly 2 is a die or mold 6 which is at least partially formed of gas pervious material, as in said Patent No. 2,379,401, and supported on said gate asembly around said mold is a bell or chamber 8 afforded a relatively gas-tight seal at 10 and movable into and out of engagement with the gate asembly by means of an associated derrick or hoist (not shown). The bell 8 is connected to the vacuum line 12 by two branches therein designated respectively 14 and 16, said branches being flexible in actual practice to facilitate raising and lowering of the bell with respect to the gate assembly, as above described.

Exhaust means for the vacuum line 12 is provided in the form of a relatively large vacuum pump 18 and an auxiliary vacuum tank 20 having several times the volume of the bell 8, said tank being connected to a relatively small auxiliary vacuum pump 22 through a cock or shut-off valve 24. The tank 20 is connected to the main vacuum line 12 by a branch line 26, and the pump 18 is connected to the line 12 by a branch line 28, said branch line 28 being connected to the branch line 26 by a sub-branch line 30. A cock or shut-off valve 32 is provided in the branch line 28 for opening and closing the same, and a cock or shut-off valve 34 is provided in the sub-branch line 30. A cock 36 is also provided in the branch line 26 adjacent the tank 20 for opening and closing its connection to the main vacuum line 12, and the branch line 26 is connected to the main line 12 through a gate valve 38 operable to regulate the rate at which gas is exhausted therethrough, as hereinafter described. The gate valve is actuated by a lever 40 which is connected to a cam follower 42 by a link 44, said follower being afforded a fixed pivot at 46 and being operatively engaged with the edge of a cam 48 which is rotatable on the axis or pivot point 50 by an associated motor, as hereinafter described in detail.

A by-pass valve mechanism generaly designated 52 is connected to the system by a passage 54 through a three-way cock or valve 56 which may be adjusted so that atmospheric pressure enters the line 12 either directly or through the bell 8 by means of the branch line 14. It may be noted at this point that under certain conditions the character of the gas permeable mold or die 6 is such that explosive gas mixtures are generated as molten metal is drawn from the container 4 into the die. Under these circumstances, it is desirable to adjust the cock 56 so that atmosphere entering the system, for the purpose hereinafter set forth, is directed through the bell 8, thus carrying away the explosive gas mixture therein and thereby minimizing the possibility of explosion.

A by-pass valve seat member 58 is supported within the passage 54 by means of a tension spring 60 which is connected at its upper end to a cam follower 62 afforded a fixed pivot at one end therof as at 64, said follower being operatively engaged with the edge of a cam 66 which is rotated on the axis 68 by means of an associated motor, in the manner hereinafter more particularly described. The passage 54 is connected at its upper extremity to a chamber 70 through a restricted seat portion 72 against which the valve member 58 may abut when the vacuum in the system reaches a predetermined low value under the conditions hereinafter discussed.

The chamber 70 is provided with an adjustable vent or cock 74 which is open to the atmosphere, and said chamber is also provided with a relatively large inlet 75 communicating with the atmosphere. A valve member 76 is supported within the chamber 70 by means of a tension spring 78, substantially weaker than the spring 60, and operable to urge the member 76 toward its closed position over the inlet 75. The chamber 70 is also provided with an opening in the bottom thereof, and a fiber disc 80 is mounted around said opening with a port 82 in the top thereof, said opening being closed by a flexible diaphragm 84 carrying a movable electric contact 86 for engagement with a fixed electric contact 88 under the circumstances, and for the purpose hereinafter described. A spring 90, weaker than the spring 78, is compressed between the disc 80 and the diaphragm 84 for urging the latter outwardly of the chamber 70 and thereby urging the contact 86 into engagement with the contact 88.

Before describing my novel apparatus in detail, I shall first point out briefly the manner in which the system functions with particular reference to the structure above discussed. The primary object of my invention is to gradually increase the vacuum in the system at any desired predetermined rate, thereby predetermining the rate at which the mold 6 is filled despite varying amount of core gases which may be released as the molten metal contacts the gas permeable portions of the mold. When the necessary amount of vacuum has been develpoed in the system to fill the mold, the vacuum is maintained at that level for any desired predetermined period of time to permit solidification of the metal within the mold and thereafter, the vacuum is automatically released in order to permit elevation of the bell from the gate assembly 2, which is then removed from the container 4. These objects of my invention are, to some extent, obtained by the apparatus illustrated in said Patent No. 2,402,913; however in actual practice, certain difficulties have arisen which the present invention overcomes. Thus it has been found desirable to control the rate at which gas is exhausted by the system in such manner as to increase the rate of exhaustion in the event that the vacuum is not being developed for any reason at the desired rate.

At the start of a cycle, the follower 62 is in its lowest position engaged with the smallest radius of the cam 66 and likewise, the follower 42 is in its lowest position in engagement with the smallest radius of the cam 48. The cock 34 is closed and the rest of the cocks are open. Both pumps are operating, and the gate valve 38 is closed so that a vacuum of about twenty-five inches is built up in the tank 20. At this point there is a very slight vacuum within the chamber 70 because of the tendency of the spring 78 to move the valve member 76 to its closed position over the inlet 75. This slight vacuum is sufficient to lift the contact 86 from engagement with the contact 88.

As the cam 66 rotates at a predetermined rate of speed, tension is built up by the follower 62 in the spring 60, which thus exerts a gradually increasing force to urge the valve member 58 to its closed position, thereby gradually increasing the vacuum in the line 12 so that metal is drawn through the gate assembly 2 into the mold 6. Whenever the pump 18 is incapable of exhausting the core and atmospheric gases from the bell 8, and in addition thereto a sufficient amount of atmospheric gas through the opening 72, to maintain the valve member 58 in its open position against the gradually increasing stress of the spring 60, the valve member 58 closes and almost immediately the valve member 76 closes the inlet 75. At this point atmospheric pressure enters the cock 74 and relieves the vacuum within the chamber 70 and within the fiber disc 80, thus permitting the spring 90 to urge the movable contact 86 against the contact 88, thereby closing an electric circuit through a solenoid clutch which connects a revolving electric motor to the cam 48, as hereinafter described in detail. The cam 48 thus rotates on its axis 50 and raises the cam follower 42 to gradually open the gate valve 38 by means of the lever 40. This causes vacuum in the tank 20 to be admitted to the system, thereby increasing the vacuum therein and moving the valve member 58 to its open position, thus re-establishing the vacuum in the chamber 70, whereupon the diaphragm 84 is raised against the resistance of the spring 90 to break the electric circuit actuating the motor for the cam 48.

Referring now to Figures 2 and 3 which illustrate in detail my novel by-pass valve mechanism 52, it may be noted that a pipe 92 is connected to the main vacuum line fragmentarily indicated at 12, said pipe providing the before-mentioned passage 54 communicating with said line. A cap 94 is threaded on the upper end of the pipe 92 and comprises a central opening, the margin of which is provided with the before-mentioned seat at 72 (Figures 1 and 2) for cooperation with the valve seat member 58 which is connected by means of a chain 96 to a square rod 98 which extends through a square bearing 100 and is in turn connected to the tension spring 60. It will be understood that by means of the square rod and bearing 98 and 100, the seat member is restrained against rotational movement and is permitted vertical movement only, as is necessary in the normal operation of the mechanism. The upper end of the spring 60 is threaded on a bolt 102, the threads of which have the same pitch as the coils of the spring 60. The bolt extends through a shaft 104 which is pivotally mounted on the cam follower 62, and an adjusting nut 106 and lock nut 108 are threaded on the bolt 102, the adjusting nut 106 being seated against the shaft 104. This arrangement permits the operator to alter the effective length of the spring 60 without varying the initial tension thereof by rotating the head 110 of the bolt 102, thus simultaneously threading it into the spring 60 and the adjusting nut 106. If, on the other hand, the operator desires to adjust the initial tension on the spring 60 without altering the effective length thereof, this may be accomplished by rotating the adjusting nut 106 and holding the head 110 of the bolt against rotation.

It will be understood that by altering the effective length of the spring 60 by means of the bolt 102 in the manner above described, the spring 60 may be placed under any desired maximum tension when the cam follower 62 is in its highest position, and it will also be understood that adjustment of the spring by the nut 106 places any desired starting tension on the spring when the cam follower 62 is in its lowest position. Thus, the initial vacuum value within the system and the maximum vacuum value therein are independently adjustable.

The follower 62 comprises a roller 112 engaged with the edge of the cam 66, which is mounted on a shaft 114 by means of a hub 116 of the cam 66. The frame 118 is mounted as at 120 on a frame support 122 which is secured in any convenient manner, as by welding, to the pipe 92. The shaft 114 also rotates two cams 126 and 128 which are mounted thereon for actuation of two double-throw microswitches 130 and 132 respectively, said microswitches serving a purpose hereinafter described in particular. The shaft 114 is driven by a planetary gear assembly of conventional design contained within a suitable housing indicated at 134, said housing being prevented from rotating by a bracket 136 on a lock pin 137 mounted on the frame 118, said pin also serving to prevent rotation of the microswitch frame 138. The planetary gear assembly is driven by a worm ring gear 140, and a worm drive gear 142, which is driven by the motor 144 mounted by brackets 146, 146 on the frame 118. It will be understood by those skilled in the art that by adjusting the speed of the motor 144 and by substituting various conventional designs of planetary gear assemblies, the cam 66 may be driven at a wide range of speeds to suit various conditions.

Intermediate its ends the cam follower 62 is pivotally connected at 148 to the piston rod 150 of a hydraulic shock absorber device, the cylinder 152 of which is pivotally mounted by a pin 154 on the frame 118. The piston rod 150 is connected to a piston head 156 (Figure 2) with a passage 158 therethrough, said passage being closed by a resilient flapper valve plate 160 having an orifice 162 therethrough. Thus, as the follower 62 is elevated by the rotation of the cam 66, the hydraulic fluid within the cylinder 152 may flow freely through the passage 158, forcing the plate 160 into open position. When, however, the follower falls from the largest radius of the cam 66 to the smallest radius thereof, at the end of a cycle of operations, the hydraulic pressure in the cylinder 152 closes the flapper plate valve as the piston head 156 moves downward and the hydraulic fluid is metered through the orifice 162, thus cushioning the fall of the follower 62 and preventing consequent damage to the cam 66 and the follower.

It may be noted that the extremity of the follower, remote from the cam 66 is pivotally mounted at 64 (Figures 1 and 2) to the frame 118.

The valve member 76, as illustrated in Figure 2, consists of a pair of metallic plates 164 and 166 with a flexible disc 168 sandwiched therebetween, the plate 166 and the disc 168 being of greater diameter than that of the plate 164 and being adapted to close the inlet 75 in the closed position of the valve member 76 which, as above described, is actuated to its closed position by a spring 78. The spring 78 is connected at its upper end to a bolt 170 adjustably mounted on a bracket 172 by means of a pair of nuts 174, 174, said bracket being mounted on the top of the chamber 70. It may be also noted in Figure 2 that the flexible diaphragm 84 is sandwiched between a pair of metallic plates 176, 176 affording a convenient connection to the movable contact 86 which is energized, as hereinafter described in detail, by means of a flexible wire 177 connected to a binding post 178 (Figures 2 and 8). The fixed contact 88 is mounted on a bracket 180 which is supported from the bottom of the chamber 70 and also affords convenient support for the binding post 178.

Referring now to Figures 4 through 7, it will be seen that the gate valve 38, of conventional design, is mounted on a platform 182 which is supported by columns or legs 184, 184 from a base plate 186, and the valve 38 is actuated by the beforementioned lever 40 which is connected by the link 44 to the cam follower 42 comprising a bearing 194 at one end thereof pivoted by means of pins 196, 196 to a bracket or support member 198 mounted on the base plate 186. At its opposite end the cam follower 42 comprises a roller 200 operatively engaging the edge of the cam 48 which is mounted on a hub 204 carried by a shaft 206 connected to a gear box 208 containing a conventional gear mechanism for driving the shaft 206. The gear mechanism within the box 208 is driven by a shaft 210 connected to a clutch plate 212 disposed between a rotating driver clutch plate 214 and a nonrotatable brake plate 216. The clutch plate 212 is actuated by a yoke 218 pivoted at 220 to a bracket 222 on the base plate 186, said yoke being pivoted intermediate its ends at 223 to a thrust collar 224 bearing at one end thereof against a collar 226 mounted on a hub of the clutch plate 212. The opposite end of the thrust collar 224 is operatively engaged by suitable ball bearings 228, 228 with a collar 230 mounted on the hub of the clutch plate 212. The yoke is connected adjacent its upper extremity to a brake spring 232 connected by an adjusting screw or bolt 234 (Figure 5) to a bracket 236 on the brake clutch frame 238 to which the brake plate 216 is secured as at 239. The upper end of the yoke is also connected to the clutch operating spring 240 which is connected to the solenoid armature 242 actuated by a solenoid 244, as hereinafter described. The solenoid is mounted on a bracket 246 carried by the brake clutch frame 238.

The rotatable driver clutch plate 214 is mounted on a shaft 247 supported by suitable ball bearing units 249, 249 on the frame 238, and intermediate its ends the shaft 247 carries an adjustable V-pulley 251 of conventional design, said pulley being driven by a V-belt 253 which is in turn driven by an adjustable V-pulley 248 rotated by the motor 250.

It may be noted at this point that the hub 204 for the cam 48 also carries two arcuate cams 252 and 254 (Figure 6) mounted respectively on collars 256 and 258 which may be integral with said bearing or fixed thereto in any convenient manner, said cams being engageable respectively, for a purpose hereinafter described, with cam members 260 and 262 (Figure 6) on the cam follower arms 264 and 266 respectively which are secured in any convenient manner as by welding to the cam followers 268 and 270. The cam follower 268 is connected by a round rod or pin 271 to a small internal diameter collar 272 carrying a flat spring 274 for actuation of a microswitch 276 (as best seen in Figure 7) under the conditions hereinafter described. The cam follower 270 is connected by a tube 278 sleeved over the rod 271 to the large internal diameter collar 280 carrying a flat spring 282 for actuation of the microswitch 284. The tube 278 is carried by a sleeve member 286 of a bracket generally designated 288 which supports the microswitches 276 and 284, said bracket being mounted at 290, 290 (Figure 5) on the gear box 208.

Referring now to Figure 8 which is a schematic diagram of the electrical circuits utilized in my invention, I shall explain these circuits and the function thereof by describing in detail a complete cycle of operations of my novel apparatus. The operator closes the momentary contact switch 292 on the panel 294 and then releases said switch. This closes three parallel circuits, one through the timer motor 296 of a conventional timer mechanism containing all of the elements within the dotted line 298, a second circuit through the solenoid 300 which actuates the gear 302 into operative relationship with the motor 296 for driving engagement therewith, and a third circuit through the relay 304 which thereby separates contacts 306 and brings contacts 308 into engagement, thus closing holding circuits through the motor 296, the solenoid 300, and the relay 304. It may be noted at this point that after a predetermined period of time, the gear 302 is operable to open the normally closed switch 310 through which all of the above-described circuits are closed, thus breaking the holding circuits after a predetermined time limit.

When the contacts 308 are closed, two parallel circuits are established, one through the motor 144 (Figures 2, 3 and 8) causing said motor to rotate the cam 66, thereby raising the cam follower 62; and the other circuit is closed through the relay 312 which thereby separates contacts 314 through which a circuit would otherwise have been closed through the timer motor 316, thus allowing the latter to automatically set to zero and at the same time to close contacts 318 thereby closing a circuit through the motor 250 (Figures 4–6, and 8). The relay 312 and the timer motor 316, as well as the contact points 314 and 318, are contained within a conventional timer and relay assembly generally indicated at 320 (Figures 4 and 8).

Immediately upon actuation of the motor 144 and the cam 66, the cam 126 (Figures 3 and 8) closes points 322 (Figure 8) of the double-throw microswitch 130 (Figures 3 and 8) and opens the points 324 thereof, thus energizing the wire 326 which is connected to the fixed contact 88 (Figures 1, 2 and 8). This permits a circuit to be closed through the solenoid 244 (Figures 4, 5 and 8) in the event that the valve member 58 (Figure 2) moves to its closed position, thereby permitting the movable contact 86 (Figures 2 and 8) to engage the contact 88.

Under these conditions, whenever vacuum in the system falls below the value necessary to keep the valve member 58 in open position, the diaphragm 84 (Figures 1, 2 and 8) drops, closing the above-mentioned circuit through the solenoid 244 which actuates the armature 242 (Figure 5) and thereby the yoke 218 (Figure 5) in such manner as to engage the clutch plates 212 and 214, thus rotating the cam 48 to raise the cam follower 42 from its lowest position, and thereby gradually opening the gate valve 38 to increase the vacuum in the system until the valve member 58 is again opened, whereupon the diaphragm 84 is lifted and the circuit through the solenoid 244 is broken. The brake spring 232 (Figure 5) is thereupon immediately operable to urge the clutch plate 212 against the brake plate 216, thus stopping rotation of the cam 48.

Whenever the cam 48 lifts its follower 42 to the maximum height illustrated in Figure 6, the cam 252, as seen in that figure, engages the member 260, thus rotating the collar 268 in a counterclockwise direction, as seen in Figure 6, and thereby causing the spring 274 to open the contact points 328 (Figure 8) in the microswitch 276 (Figures 5 and 8). This breaks the circuit through the solenoid 244 regardless of the value of the vacuum in the system, thus maintaining the vacuum at a maximum value until the cycle has been completed.

It may be noted at this point that whenever the follower 42 is in its lowest position upon the cam 48, the cam 254 opens the contacts 330 (Figure 8) in the microswitch 284.

When the cam 66 (Figures 2 and 3) raises the follower 62 to its maximum height, the cam 128 (Figures 3 and 8) closes the points 332 (Figure 8) in the microswitch 132 (Figures 3 and 8) and opens the contact points 334 therein, thus breaking the circuit through the motor 144 (Figures 2, 3 and 8) and also breaking the circuit through the relay 312 (Figure 8) which thus closes contact points 314 and thereby establishes a circuit through the timer motor 316 which, after an adjustable period of time, opens the contact points 318 and breaks the circuit through the motor 250 which operates the cam 48 (Figures 4-6). As the points 318 open, the time motor 316 stalls by means of conventional mechanism (not shown) within the timer and relay assembly 320. Thus the cam 48 is actuated for an adjustable period of time after the motor 144 and the cam 66 stop, in order to permit the gate valve 38 to be opened after the motor 144 has stopped for the purpose of increasing the vacuum in the system, if necessary, as it levels off to a constant value after the cam 66 has stopped rotating with the follower 62 in its highest position.

From this time on, the vacuum in the system is maintained at a constant value until the gear 302, after a predetermined period of time necessary to insure solidification of the casting within the mold 6 (Figure 1), closes the normally open switch 336 and, after an adjustable interval of approximately one second, opens the normally closed switch 310, said switch 336 when closed establishing a circuit through an associated mechanism (not shown) for lifting the bell and gate assembly (Figure 1) from the pot of metal 4. When the switch 310 is opened, the circuit through the relay 304 is broken and this causes contact points 306 to be closed and the points 308 to be opened, the opening of the points 308 breaking all of the circuits established therethrough. The closing of points 306 now closes circuits through the motor 144 and the relay 312, since the contact points 332 of the microswitch 132 have been closed by means of the cam 128, and thus the motor 144 rotates the cam 66 so that its associated follower 62 drops to its lowest position, ready for another cycle. At this point the cam 128 opens the contacts 332 and closes the contacts 334 of the microswitch 132, thus breaking the circuits through the motor 144 and the relay 312 and placing the switch 132 in its original position for the start of a new cycle. The motor 250, as above described, continues to run until the timer motor 316 opens the points 318 within the assembly 320.

At the time that the cam 128 opens the points 332 within the switch 132, the cam 126 closes the points 324 and opens the points 322 within the microswitch 130. The closing of the points 324 establishes another circuit through the solenoid 244, inasmuch as the points 330 of the microswitch 284 are at this time in closed position. Thus, the cam 48 rotates to its original position, at which time, the cam 254 opens the contact points 330, thus breaking the last-mentioned circuit through the solenoid 244 and consequently stopping rotation of the cam 48. It may be noted that as soon as the cam 48 reaches its original position, the cam 252 closes the points 328 in the microswitch 276 preparatory to a new cycle; however, this can not establish a circuit through the solenoid 244 inasmuch as the contact points 322 of the microswitch 130 have been separated by the cam 126.

It may be noted that the electric current for the circuits closed through the normally open switch 336 is supplied by means of two main leads 338 and 340 connected to a suitable source of electric current (not shown), and the lead 340 comprises a switch 342 therein which, if closed, permits a circuit to be established through the associated hoist means (not shown) automatically upon closing of the switch 336 by the gear 302, as above described. In the event, however, that this automatic action is not desired, the switch 342 may be left open and a circuit may be closed through said hoist means by closing the switch 344, both of said switches being mounted on the before-mentioned panel 294. The current for the rest of the above-described circuits is provided by means of two main leads 346 and 348 which are connected to a suitable source of electric current( not shown), said leads comprising respectively the branch leads 350 and 352 which supply current to the elements within the timer mechanism 298.

Referring again to Figure 1, it will be understood that if desired, the pump 18 may be utilized as the sole exhaust means for the system, providing that its capacity is sufficient to increase the vacuum in the system at the desired rate. This may be accomplished by closing the cocks 32 and 36 and opening the cock 34. Under these conditions, the gate valve 38 is still operable as a throttle to gradually increase the rate at which gases may be exhausted therethrough whenever the vacuum in the system is insufficient to maintain the valve member 58 in its open position. It is also possible to utilize the tank 20 and the pump 22 as the sole means of exhausting the system by closing cocks 32 and 34 under conditions wherein the capacity of the tank 20 and the pump 22 are sufficient for the purposes above described.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a vacuum system comprising a bell to be evacuated and a vacuum line connected to said bell, the combination of exhaust means connected to said line, a by-pass valve mechanism associated with said system, said mechanism including an inlet chamber communicating with said system, another chamber connected to said inlet chamber through an intervening port, a valve member within said inlet chamber comprising a seat for cooperation in the closed position of said member with a complementary seat defining the margin of said port, whereby the same is closed, resilient means for urging said valve member to its closed position, means for increasingly stressing said resilient means according to a predetermined pattern to control the rate at which vacuum is built up in said system, an inlet to said second-mentioned chamber communicating with the atmosphere, valve means for closing said inlet, relatively weak resilient means for urging said valve means to its closed position, a relatively small vent in said second-mentioned chamber communicating at all times with the atmosphere, an opening through said second-mentioned chamber closed by a flexible diaphragm, an external electric contact carried by said diaphragm and movable therewith, a fixed electric contact adjacent said movable contact, and resilient means for urging said movable contact into engagement with said fixed contact, said last-mentioned resilient means being relatively weak with respect to said first and second-mentioned resilient means, whereby a slight vacuum within said second-mentioned chamber is operable to flex said diaphragm inwardly with respect thereto and to thereby move said movable contact out of engagement with said fixed contact, a gate valve in the connection between said line and said exhaust means, said gate valve comprising means for increasing the volume of exhausted gas which may pass therethrough, and actuating means for said gate valve including an electric circuit closed through said contacts.

2. In a vacuum system including a bell to be evacuated and a vacuum line connected thereto, the combination of main and auxiliary exhaust means independently connected to said line, a by-pass valve mechanism comprising an inlet chamber connected to said system, another chamber connected to said inlet chamber through an intermediate port, a valve member within said inlet chamber comprising a seat cooperating in the closed position of said member with a complementary seat around the margin of said port, resilient means for urging said valve member to its closed position, means for gradually increasing the stress on said resilient means according to a predetermined rate, an inlet to said second-mentioned chamber communicating with the atmosphere, valve means for closing said inlet, resilient means for urging said valve means to its closed position, said last-mentioned resilient means having substantially less capacity than said first-mentioned resilient means, a relatively small vent in said second-mentioned chamber communicating at all times with the atmosphere, an opening through said second-mentioned chamber closed by a flexible diaphragm, an external electric contact movable with said diaphragm and disposed externally with respect to said second-mentioned chamber, a fixed electric contact adjacent said movable contact, and resilient means under compression between said diaphragm and abutment means within said second-mentioned chamber for urging said movable contact into engagement with said fixed contact, said last-mentioned resilient means having substantially less capacity than either of said first or second-mentioned resilient means, control means for gradually opening the connection between said auxiliary exhaust means and said line, the connection of said main exhaust means with said line being fully open at all times, and actuating means for said control means comprising an electric circuit closable through said contacts.

3. In a vacuum system comprising a bell to be evacuated and a vacuum line connected to said bell, the combination of exhaust means connected to said line, a by-pass valve mechanism associated with said system, said mechanism including an inlet chamber communicating with said system, another chamber connected to said inlet chamber through an intervening port, a valve member within said inlet chamber comprising a seat for cooperation in the closed position of said member with a complementary seat defining the margin of said port, whereby the same is closed, resilient means for urging said valve member to its closed position, means for increasingly stressing said resilient means according to a predetermined pattern to control the rate at which vacuum is built up in said system, an inlet to said second-mentioned chamber communicating with the atmosphere, valve means for closing said inlet, relatively weak resilient means for urging said valve means to its closed position, a relatively small vent in said second-mentioned chamber communicating at all times with the atmosphere, an opening through said second-mentioned chamber closed by a flexible diaphragm, an external electric contact carried by said diaphragm and movable therewith, a fixed electric contact adjacent said movable contact, and resilient means for urging said movable contact into engagement with said fixed contact, said last-mentioned resilient means being relatively weak with respect to said first and second-mentioned resilient means, whereby a slight vacuum within said second-mentioned chamber is operable to flex said diaphragm inwardly with respect thereto and to thereby move said movable contact out of engagement with said fixed contact, control means for increasing the rate at which gas is exhausted by said exhaust means, and actuating means for said control means including an electric circuit closable through said contacts.

4. In a vacuum system comprising a chamber to be evacuated and a vacuum line connected thereto, the combination of main and auxiliary exhaust means having independent connections to said line, valve means communicating with the atmosphere and comprising a passage connected to said system, a valve member comprising seat means for engagement with a seat portion of said passage for closing the same, resilient means for urging said member to its closed position, and means for gradually increasingly stressing said resilient means and thereby increasing its force operable to urge said member to its closed position, the connection between said main exhaust means and said line being open and the connection between said auxiliary exhaust means and said line being substantially closed at the start of a cycle, and means for automatically gradually opening said last-mentioned connection when said seat member is in its closed position.

5. In a vacuum system comprising a bell to be evacuated and a vacuum line connected thereto, the combination of a valve device including spaced chambers and an intervening passage, one of said chambers being connected to said system and the other of said chambers having a connection to the atmosphere, a valve member for closing said passage, resilient means for urging said member to its closed position against atmospheric pressure, and means for gradually increasingly stressing said resilient means and thereby increasing its force for urging said member to the closed position thereof, exhaust means connected to said line, and control means responsive to normal atmospheric pressure within said second-mentioned chamber for gradually increasing the amount of gas exhausted by said exhaust means, said control means including a gate valve in the connection of said exhaust means to said line, and operating means for said valve including an electric circuit closed through a fixed and a movable contact, said movable contact being mounted in an opening through said second-mentioned chamber, whereby evacuation thereof causes said movable contact to be urged by atmospheric pressure out of engagement with said fixed contact.

6. In a vacuum system comprising a bell to be evacuated, a gate assembly having a substantially gas-tight connection to said bell, said assembly comprising means communicating with molten metal exterior of said bell, a mold mounted on said assembly within said bell, said mold being at least partially formed of gas permeable material, and a vacuum line connected to said bell, the combination of a valve device including spaced chambers and an intermediate port, one of said chambers being connected to said bell independently of its connection to said line, and the other of said chambers communicating with the atmosphere, a valve member for closing said port, resilient means for urging said valve member to its closed position against atmospheric pressure, and means for increasingly stressing said resilient means according to a predetermined rate, exhaust means connected to said line, and control means responsive to normal atmospheric pressure within said second-mentioned chamber for increasing the rate at which gas is exhausted by said exhaust means.

7. In a vacuum system having a source developing said vacuum, control means having a cycle operable to increase said vacuum in said system at a predetermined rate, said means comprising a valve in said system having an opening normally substantially closed to the atmosphere at the beginning of said cycle, a coil tension spring operable at the beginning of said cycle to maintain said valve in said substantially closed position, and automatic actuating means for said valve, including cam means operatively connected to said spring and adapted to augment the stress thereof at a predetermined rate at the beginning of said cycle to reach and maintain a maximum for a major portion of said cycle, and to return said stress to normal at the end of said cycle, said operative connection comprising a bolt threaded into said spring, the threads on said bolt being of substantially the same pitch as the coils of said spring, whereby the effective length thereof may be varied without altering the initial stress thereon.

8. In a vacuum system comprising a chamber to be evacuated and a vacuum line connected thereto, the combination of main and auxiliary exhaust means having independent connections to said line, valve means communicating with the atmosphere and comprising a passage connected to said system, a valve member comprising seat means for engagement with a seat portion of said passage for closing the same, resilient means for urging said member against the resistance of atmospheric pressure to its closed position, the connection between said main exhaust means and said line being open and the connection between said auxiliary exhaust means and said line being substantially closed at the start of a cycle, and electrically operated means responsive to atmospheric pressure within said valve means for gradually opening said last-mentioned connection when said seat member is in its closed position.

9. Casting apparatus comprising a vacuum housing, a gate assembly connected to said housing, a mold mounted in said housing over said assembly, said mold being at least partly formed of gas pervious material, a vacuum line connected to said housing, means for yieldingly permitting, while resisting with gradually increasing force, the entrance of atmospheric pressure to said housing, and means for evacuating said line, said last-mentioned means including means for increasing the rate at which gases are exhausted from said line whenever the vacuum therein is insufficient to permit atmospheric pressure to overcome the resistance to its entrance into said housing by said first-mentioned means.

10. In a vacuum system including a primary chamber to be evacuated, a vacuum line and a pump for evacuating said chamber through said line, mechanism for controlling the degree of vacuum in said chamber comprising an auxiliary chamber, a by-pass line from said auxiliary to said primary chamber, a valve controlling said by-pass line, resilient means urging said valve into closed position against the action of vacuum in said by-pass line tending to keep said valve open, a second valve controlling the admission of atmospheric air into said auxiliary chamber, a weaker resilient means tending to close said second valve, a second source of vacuum and means operative whenever vacuum in said by-pass line is insufficient to keep said first valve open to connect said second source of vacuum into said vacuum line to increase the vacuum in said by-pass line and cause said first valve again to open.

11. In a vacuum system including a primary chamber to be evacuated, a vacuum line and a pump for evacuating said chamber through said line, means for controlling the admission of atmospheric air directly into said primary chamber to control the degree of vacuum therein comprising a conduit connected into said chamber and having an inlet from the atmosphere, a valve positioned in said inlet, resilient means urging said valve into closed position and means for varying the stress of said resilient means to control the amount of atmospheric air admitted through said inlet and conduit to said chamber and thus control the degree of vacuum therein.

12. In a vacuum system including a primary chamber to be evacuated, a vacuum line connected to said chamber and a pump for evacuating said chamber through said line, means for controlling the admission of atmospheric air into said system comprising a branch line from said vacuum line directly connected to said primary chamber at a point spaced from the connection of said vacuum line to said primary chamber, a valved inlet into said branch line from the atmosphere and a multi-way cock in said branch line controlling the passage of atmospheric air from said inlet to admit such air either directly to said vacuum line or directly to said primary chamber to control the degree of vacuum within said primary chamber.

M. H. KALINA.

REFERENCES CITED

The following references are of record in the file of this patent:

UNITED STATES PATENTS

| Number | Name | Date |
|---|---|---|
| 674,840 | Hoffmann | May 21, 1901 |
| 930,989 | Richards | Aug. 10, 1909 |
| 1,009,400 | Fordyce et al. | Nov. 21, 1911 |
| 1,084,277 | Jennings | Jan. 13, 1914 |
| 1,354,286 | DeBats | Sept. 28, 1920 |
| 1,703,739 | Klepsch | Feb. 26, 1929 |
| 1,987,666 | Carlson | Jan. 15, 1935 |
| 2,138,527 | Newman | Nov. 29, 1938 |
| 2,140,607 | Thompson | Dec. 20, 1938 |
| 2,232,267 | Price | Feb. 18, 1941 |
| 2,289,484 | Coley | July 14, 1942 |
| 2,338,098 | Davis | Jan. 4, 1944 |
| 3,379,401 | Poulter | June 26, 1945 |